_United States Patent Office_

3,671,266
Patented June 20, 1972

3,671,266
PROCESS FOR MAKING HEXITOL COATED NUTS
Irwin Cooper, Staten Island, N.Y., and Wilbur Allen Parker, Somerville, and Daniel Melnick, West Englewood, N.J., assignors to CPC International Inc.
No Drawing. Filed Aug. 29, 1969, Ser. No. 854,261
Int. Cl. A23l 1/36
U.S. Cl. 99—126                                                    30 Claims

ABSTRACT OF THE DISCLOSURE

A process for producing a hexitol coated nut product comprising providing hexitol coated raw nuts, roasting the nuts in a hot gaseous environment, cooling the roasted nuts, and recovering the coated nut product.

---

The invention is concerned with a hexitol coated nut product and methods of making this hexitol coated nut product.

Present processes for producing dry roasted, hexitol-coated nuts comprise either first roasting the nuts and then coating them with the hexitols, or roasting the nuts in molten baths of the coating agent to form the roasted coated nuts. The hexitol coating agents generally used in producing nuts are hexitols such as mannitol and sorbitol and mixtures thereof.

Roasting the nuts followed by coating them requires two heating steps, one for roasting and a second for coating. This leads to increased production costs.

Roasting the nuts in molten hexitols leads to a buildup of hexitol on the processing equipment and development of nut degradation products in the hexitol bath. The degradation products must be removed or nuts of non-uniform color will be obtained. Contamination of the nut products with pieces of congealed hexitols also frequently occurs, and such pieces are extremely undesirable. The economics of the roasting-in-hexitol operation are not favorable because of the high melting point of the hexitol blend.

When presently available processes are used for producing hexitol coated nuts, the hexitol coating generally must contain at least about 10% sorbitol and more usually contains 25%-35% sorbitol. When the concentration of sorbitol in the molten hexitol bath is less than about 10%, higher temperatures are required to maintain the bath in a molten state during the roasting, and the solidification of the molten hexitols on the roasted nuts, upon removal from the bath is extremely rapid.

An economical process for simultaneously roasting and fusing a uniform, flavorful and protective hexitol coating onto nuts wherein any desired relative proportions of mannitol and sorbitol are incorporated in the coating on the nuts would be highly desirable.

In view of the above, it is an object of the invention to provide an improved, practical method for making dry hexitol coated roasted nuts.

Another object of the invention is to make dry roasted nuts whereby any desired ratio of mannitol to sorbitol may be incorporated into the coating.

Still another object of the invention is to provide an improved process for making dry roasted nut products wherein the coating of the nuts contains at least about 80% mannitol and thereby sets up especially quick.

And still another object of the invention is to provide an improved process for making dry roasted nut products wherein the nuts are always roasted in an environment of virgin hexitols and hence free from degradation products of heat abused hexitols and from congealed hard pieces of the roasting medium.

Other objects will appear hereinafter from the description which follows and from the scope of the appended claims.

GENERAL DESCRIPTION OF THE INVENTION

In the broadest sense, the invention comprises a process for producing a coated nut product comprising providing raw, hexitol-coated nuts, roasting the nuts in a hot gaseous environment, cooling the roasted nuts, and recovering the coated nut product. The invention also embraces a nut product coated with a hexitol coating.

By the term "hexitol" we mean mannitol, sorbitol, and mixtures thereof. Preferably the hexitol comprises at least 60% by weight of mannitol, and most preferably, at least 80% by weight of mannitol. When mannitol is present in an amount above 60% and more preferably at or above about 80%, the resulting coated nut product will rapidly develop a non-tacky uniform, hardened surface, following roasting. This is highly desirable since the nuts can then be transported and packaged shortly after roasting, without sticking to the handling equipment or packages or agglomerating.

COATING OF RAW NUTS

The raw, hexitol-coated nuts may be provided by any of several procedures. Preferably the nuts are first blanched and then an incipient coating is applied by one of the procedures outlined in following. Unblanched raw nuts may, however, also be processed in accordance with the invention.

The term "incipient coating" is used to describe a layer of a hexitol applied to the raw nut surfaces. The incipient coating may comprise, for example, a deposit on the raw nut surface of a mixed aqueous solution and dispersion of a hexitol coating agent.

One preferred procedure for applying an incipient coating consists of wetting the nuts with a hot aqueous solution of a hexitol. Another preferred procedure for applying the incipient coating consists of wetting the nuts with an aqueous liquid, such as water, and then applying to the wet surfaces a powder of the comminuted hexitol. The aqueous liquid may be, but need not be, an aqueous solution of a hexitol. Yet another preferred procedure consists of wetting the raw nuts with an aqueous slurry having both dissolved and suspended therein a hexitol.

The aqueous medium, liquid, solution, or slurry, as the case may be, can have dissolved therein salt, spices, coloring materials, and the like, for enhancing the flavor, color, aroma, appearance, and general attractiveness of the final product.

When the incipient coating is applied by wetting the nuts with an aqueous solution of a hexitol, and a comminuted hexitol is not added to the wetted nuts, it is generally preferred that the temperature of the aqueous solution is at least about 170° F. Above this temperature sufficient hexitol is present in the incipient coating to apply an adequate amount of hexitol to the nut surfaces, as will be described presently.

The wetting of the nuts may be accomplished by any of several procedures. For example, the nuts may be dipped into the aqueous medium or the aqueous medium may be sprayed onto the nuts at ambient temperature or after they are just heated to roasting temperature.

ROASTING OF THE NUTS

Roasting of the raw nuts is accomplished by heating the nuts in a hot gaseous environment which is at a temperature in the range from about 300° F. to about 500° F. Most preferably, the incipiently coated nuts are heated in a mixture of air and the combustion products of a natural gas or the like which is at a temperature in the range from about 325° F. to about 400° F.

During roasting, the incipient coating is dehydrated and the hexitols are melted to produce a hot substantially continuous, molten hexitol layer of uniform thickness.

For efficient roasting, the nuts are preferably maintained at roasting temperature for from about 2 minutes to about 30 minutes. Most preferably, the nuts are maintained in the most preferred roasting temperature range for a time from about 3 minutes to about 15 minutes.

In a particularly preferred procedure, the nuts are roasted for 1–3 minutes in a hot gaseous environment maintained at a temperature of 370° F. to 400° F. and then are further roasted for 2–14 minutes with the hot gaseous environment maintained at a temperature in the range from 325° F.–350° F.

COOLING OF THE NUTS

The nuts are preferably mildly agitated while they are being cooled by any convenient procedure. This prevents the nuts from agglomerating. The amount of agitation used should be sufficient to prevent agglomeration but should not be so vigorous as to lead to significant breaking or cracking of the nuts. No other special steps are required during the cooling process.

During the cooling step and before the coating has completely solidified, salt, spices, edible oils, and coloring materials may be added as by sprinkling and/or spraying onto the cooling nuts. The salt, spices, oils, and coloring materials readily adhere to the coating during the cooling procedure.

RESULTANT PRODUCTS

A nut product is produced by the process of the present invention that has coated thereon up to about 12% by weight of the hexitol. When the hexitol is at least about 60% and more preferably 80% by weight mannitol, the coating of the nut product hardens quickly and is desirably non-sticky. The higher level of 12% hexitol, in the coating of nuts with a high surface to volume ratio such as pecans, is obtainable by the present process.

The nut product may also contain up to about 4% by weight of salt and up to about 10% by weight of an added edible oil in the form of a film overlying the hexitol coating. When the nut product has an oil coating, it will have a shinier appearance and different taste than a similar nut product which does not contain an oil.

Two preferred classes of coated nut products can be produced in accordance with the invention. One preferred class is coated with from about 5% to about 8% hexitol and from about 1% to about 3% salt. The second preferred class is coated with from about 2% to about 4% hexitol, from about 2% to about 10% added oil, and from about 1.5% to about 2.5% salt. The percentage figures are all percent by weight.

The first preferred class of nuts has a slightly sweet and salty taste and a dry feel and eating texture. The second preferred class of nuts has sweet and salt tastes in such flavor balance that neither springs out. They look like oil-roasted nuts, and have a very smooth feel and good eating texture.

Any common edible nuts may be converted into a dry roasted, hexitol-coated nut product by the method of the invention. For example, walnuts, peanuts, pecans, brazil nuts, cashew nuts, filberts, almonds, and the like may be treated.

The following examples describe specific embodiments of the process of making the coated nut products of the invention. These examples are meant to be illustrative only, and the invention, of course, is not to be limited thereto. All parts and percentages are by weight unless expressly stated to be otherwise.

EXAMPLE I

Wetting of peanuts with solution of a hexitol followed by adding a comminuted hexitol Blanched peanuts were dipped in a 35% solution of sorbitol in water. The peanuts were removed from the bath and allowed to drain for a short period of time. The still wet peanuts were then tumbled and comminuted mannitol (5% based on the peanut weight) was dusted onto the wet nuts. The incipiently coated nuts were then roasted in a mixture of air and natural gas combustion products heated to a temperature of from about 350° F. to about 400° F., while being mildly tumbled, for about 20 minutes.

This treatment resulted in dehydration of the incipient coating, melting of the hexitols, and roasting of the nuts within the molten hexitols to produce a hot, substantially continuous, molten hexitol layer of uniform thickness. The nuts were then removed from the roasting oven and cooled. While they were being cooled, they were continuously agitated and salt, paprika, and turmeric were applied. These flavorings adhered rapidly and tenaciously to the coated nuts in the hexitol layer.

The coated, roasted nuts produced in this manner were delicious. The ratio of mannitol to sorbitol in the coating was about 4 to 1, and the hexitol coating amounted to about 6% by weight of the coated nuts.

EXAMPLE II

Wetting of peanuts with water followed by adding a comminuted hexitol

The procedure of Example I was followed with a batch of blanched raw peanuts, except that instead of being dipped into a sorbitol solution, the peanuts were dipped into tap water. The powdered mannitol was then applied to the wet nuts, to produce the incipient coating.

The nut product roasted within its continuous molten hexitol coating, comprised about 6% mannitol by weight, based on the weight of the coated nuts.

The coating on the nuts very quickly became non-sticky during cooling. The nuts had a rich, nutty flavor.

EXAMPLE III

Coating raw nuts with an aqueous solution of hexitol

A solution containing 40 parts mannitol, 10 parts sorbitol, and 50 parts water was prepared and heated to 175° F. to dissolve the hexitols. Blanched raw peanuts were then immersed in the solution for 2 minutes. The incipiently coated nuts were then removed from the bath and drained.

The nuts were then roasted and cooled as in Example I, with the application of spices. The coated nuts quickly lost all tackiness. The dry roasted nuts thus produced were crisp in texture, dry to the touch, and had a delicious, mildly sweet flavor. These nuts contained 5% hexitol with the ratio of mannitol to sorbitol being 4 to 1.

EXAMPLE IV

Coating raw nuts with aqueous slurries of hexitol

A slurry was made up at room temperature containing 40 parts mannitol, 10 parts sorbitol, 25 parts salt, and 50 parts water. Only a small portion of the hexitols dissolved in the water. The slurry was thoroughly mixed and was maintained in an agitated state and blanched, raw peanuts were immersed in it. Upon being removed from the bath, the peanuts were drained, after which they were dry roasted as described in Example I.

The resultant dry roasted nuts were crisp, dry, and delicious. These nuts contained 7% hexitol with the ratio of mannitol to sorbitol being 4 to 1.

EXAMPLE V

Preparation of dry roasted coated cashews

Cashews were roasted following the procedure of Example III.

Evaluation of the roasted cashews revealed that they had an excellent slightly sweet flavor. The mild sweetness enhanced the inherently attractive flavor of the cashews. The hexitol coating of mannitol to sorbitol, in 4 to 1 ratio, amounted to 5% of the dry roasted cashews.

EXAMPLE VI

Preparation of hexitol-coated nuts having an oil coating 100 parts peanuts were immersed in a bath of water maintained at about 75° F. After about 30 seconds, the nuts were removed from the bath and drained. While tumbling gently, the wet nuts were dusted with a dry powder blend consisting of 2.4 parts mannitol, 0.6 part sorbitol and 2 parts table salt which also contained turmeric and oleoresin paprika for coloring.

The incipiently coated nuts were then subjected to roasting as in Example I. After being withdrawn from the roaster, the nuts were tumbled in a basket, during which time 8 parts of an edible glyceridic oil was sprayed on the nuts. This refined glyceridic oil was a molten blend of 6 parts of a refined bleached cottonseed oil that had been lightly hydrogenated to a melting point of about 90° F. and 2 parts of an edible hydrogenated vegetable seed oil of a melting point of about 134° F.

The resulting coated nuts had a shiny surface and a significantly different attractive taste than nuts to which the glyceridic oil had not been added. The end-product also had a smooth feel and good eating texture. It contained 2.75% hexitol with the mannitol to sorbitol present in 4 to 1 ratio, 1.8% salt, and 7.3% of added glyceridic oil as the final coating.

CONCLUSION

The tastes of peanuts, cashew nuts, almonds, walnuts, pecans, brazil nuts, filberts, and other nuts are greatly improved when these nuts are processed in accordance with the invention. The hexitol coating produced is a substantially continuous fused layer of uniform thickness and color. This coating is in the continuous molten state during the roasting of the nuts and for this reason in some respects the end-products are basically the same as those obtained when roasting the nuts by immersion in a hot molten bath of the hexitols, but the economics and quality of end-products are superior as described earlier in this specification.

While the invention has been described in connection with specific embodiments thereof, it will be understood that it is capable of further modification, and this application is intended to cover any variations, uses, or adaptations of the invention following, in general, the principles of the invention and including such departures from the disclosure as come within known or customary practice in the art to which the invention pertains and as may be applied to the essential features hereinbefore set forth, and as fall within the scope of the invention.

That which is claimed is:

1. A process for producing a roasted nut product comprising:
   applying a coating of a hexitol to the raw nuts; then roasting the nuts in a hot gaseous environment at a temperature within the range from about 300° F. to about 500° F., to provide a molten continuous coating of hexitol;
   cooling the roasted nuts; and
   recovering the dry roasted nuts.

2. A process as in claim 1 wherein the hexitol is selected from the group of hexitols consisting of mannitol, sorbitol, and mixtures thereof.

3. A process as in claim 1 wherein the hot gaseous environment is maintained at a temperature within the range from about 300° F. to about 500° F. for a period of from about 2 minutes to about 30 minutes.

4. A process as in claim 1 including incorporating salt and spices in the coating on the nuts.

5. A process as in claim 1 including applying to the surface of the coated nuts an edible oil film.

6. A process as in claim 1 including the added step of agitating the nuts during cooling to prevent the nuts from fusing.

7. A process as in claim 1 including applying the hexitol coating to the raw nuts by the steps of wetting the nuts with an aqueous liquid, and then applying a comminuted solid hexitol powder to the wet nuts.

8. A process as in claim 7 wherein the aqueous liquid has dissolved therein a hexitol.

9. A process as in claim 1 comprising applying the hexitol coating to the raw nuts by the step of wetting the nuts with an aqueous solution of a hexitol.

10. A process as in claim 1 comprising applying the coating to the raw nuts by the step of wetting the nuts with an aqueous slurry having dissolved and suspended therein a hexitol.

11. A process for producing a hexitol-coated, dry roasted nut product comprising:
    wetting raw nuts with an aqueous medium;
    applying to the wet nuts a powder of a comminuted hexitol that is selected from the group consisting of sorbitol, mannitol, and mixtures thereof;
    then roasting the raw coated nuts in a hot gaseous environment that is maintained at a temperature in the range from about 300° F. to about 500° F. for from about 2 minutes to about 30 minutes, to provide a molten continuous coating of hexitol;
    cooling the roasted nuts while agitating to prevent agglomeration; and
    recovering the hexitol-coated roasted nuts.

12. A process as in claim 11 wherein the aqueous medium has dissolved therein a hexitol.

13. A process as in claim 11 wherein the aqueous medium has suspended therein a hexitol.

14. A process as in claim 11 wherein the aqueous medium has dissolved therein salt, spices, and coloring materials.

15. A process as in claim 11 including coating the nuts during the cooling step with salt, spices and coloring materials.

16. A process as in claim 11 including coating the nuts during the cooling step with an edible oil.

17. A process as in claim 11 wherein the hot gaseous environment is maintained at a temperature in the range from about 325° F. to about 400° F. for a time in the range from about 3 minutes to about 15 minutes.

18. A process for producing a hexitol-coated roasted nut product comprising:
    wetting raw nuts with an aqueous medium containing a hexitol selected from the group of hexitols consisting of sorbitol, mannitol, and mixtures thereof;
    roating the wetted nuts in a hot gaseous environment at a temperature within the range from about 300° F. to about 500° F. to provide a molten continuous coating of the hexitol;
    cooling the roasted nuts while agitating them to prevent agglomeration; and
    recovering the hexitol-coated roasted nuts.

19. A process as in claim 18 wherein the aqueous medium has suspended therein a hexitol.

20. A process as in claim 18 wherein the aqueous medium has dissolved therein salt, spices, and coloring materials.

21. A process as in claim 18 including coating the nuts during the cooling step with salt, spices, and coloring materials.

22. A process as in claim 20 wherein the roasting comprises heating the wetted nuts in a hot gaseous environment maintained at a temperature in the range from about 300° F. to about 500° F. for from about 2 minutes to about 30 minutes.

23. An edible nut dry roasted within a continuous coating of a hexitol that is selected from the group of hexitols consisting of sorbitol, mannitol, and mixtures thereof, wherein the coating constitutes up to about 12% by weight of the nut, and having an oil film disposed over the hexitol coating, said oil film comprising up to 10% by weight of the nut.

24. A nut in accordance with claim 23 wherein the coating consists of at least 60% by weight of mannitol with the balance being sorbitol.

25. An edible nut in accordance with claim 23 wherein the coating constitutes 2% or more by weight of the nut.

26. An edible nut in accordance with claim 23 wherein the coating constitutes from about 5% to about 8% by weight of the nut.

27. An edible nut in accordance with claim 23 wherein the coating further comprises from about 1% to about 3% of salt by weight of the nut.

28. An edible nut in accordance with claim 23 wherein the coating constitutes from about 2% to about 4% by weight of the nut.

29. An edible nut dry roasted within a continuous coating of a hexitol that is substantially free of heat degradation products and that is selected from the group of hexitols consisting of sorbitol, mannitol, and mixtures thereof, wherein the coating constitutes from about 2% to about 4% by weight of the nut, and wherein the coating comprises from about 1.5% to about 2.5% of salt by weight of the nut, said nut having an oil film disposed over the hexitol coating, the oil film constituting up to about 10% by weight of the nut.

30. An edible nut in accordance with claim 29 wherein the hexitol coating consists of 80% by weight mannitol.

References Cited

UNITED STATES PATENTS

| | | | |
|---|---|---|---|
| 3,477,858 | 11/1969 | Wells et al. | 99—126 |
| 2,926,091 | 2/1960 | Riddle | 99—126 X |
| 3,062,660 | 11/1962 | Alikonis et al. | 99—126 |
| 2,631,938 | 3/1953 | Miers et al. | 99—126 X |
| 2,742,364 | 4/1956 | Neumann | 99—127 |
| 2,860,053 | 11/1958 | Avera | 99—126 |
| 2,859,121 | 11/1958 | Avera | 99—126 |
| 3,457,087 | 7/1969 | Renner | 99—126 |
| 3,023,104 | 2/1962 | Battista | 99—126 UX |

FOREIGN PATENTS

| | | | |
|---|---|---|---|
| 501,394 | 4/1954 | Canada | 99—127 |
| 681,843 | 10/1952 | Great Britain | 99—126 |

FRANK W. LUTTER, Primary Examiner

S. L. WEINSTEIN, Assistant Examiner

U.S. Cl. X.R.

99—127, 168